Figure 1:
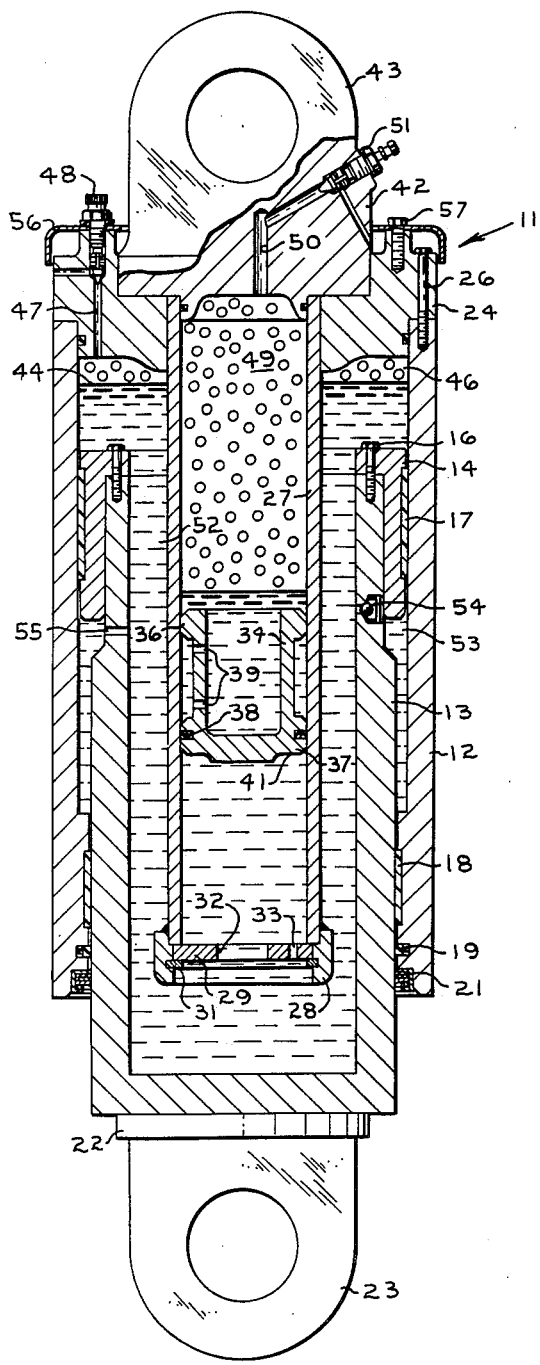

INVENTOR.
RICHARD A. BURRIS
ATTORNEYS

United States Patent Office
3,168,302
Patented Feb. 2, 1965

3,168,302
VEHICLE SUSPENSION SYSTEMS
Richard A. Burris, Pekin, Ill., assignor to Caterpillar Tractor Co., Peoria, Ill., a corporation of California
Filed Dec. 26, 1962, Ser. No. 246,990
4 Claims. (Cl. 267—64)

This invention relates to a suspension system for vehicles and particularly to a hydro-pneumatic suspension strut providing a dual rate air spring.

The suspension system of the present invention has particular application as a wheel suspension for a large capacity off-highway truck. In heavy duty off-highway equipment of this general type a very substantial difference exists between the empty and loaded weights of the machine, and it is difficult to provide a suspension system which will have acceptable operating characteristics for both conditions. For example, a single rate spring having acceptable shock absorbing characteristics when the vehicle is empty, and a spring rate sufficient to prevent excessive deflection of the spring and strut when loaded, can result in the spring being extremely stiff and low in shock absorbing capacity under load.

It is the primary object of the present invention to construct a resilient suspension having two distinct spring rates. One rate provides the desired characteristics when the machine is empty. The other is automatically selected when the load on the vehicle is increased beyond a predetermined amount. This second rate maintains sufficient shock absorbing qualities for operation of the vehicle in a loaded condition.

In accordance with the present invention two separate gas chambers are incorporated in a telescoping strut and are precharged to different pressure levels. When the vehicle is empty, only the volume of the chamber having the lower precharge is effective as a spring. As weight is added to the vehicle the gas in the chamber having the lower precharge is compressed until its pressure equals the precharge of the other chamber. Thereafter, a floating piston is effective to compress the gas in the second chamber simultaneously with compression of the gas in the first chamber. As a result, the combined volumes of the two chambers are then effective to resiliently support the vehicle. The increased volume provides a lower spring rate and increases the shock absorbing capacity of the strut when the truck is loaded.

The strut of the present invention incorporates hydraulic damping for controlling rebound. It also includes a safety arrangement whereby the precharge pressure must be vented before the strut can be disassembled. A strut incorporating these features constitutes a further object of the present invention.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

Figure 2:
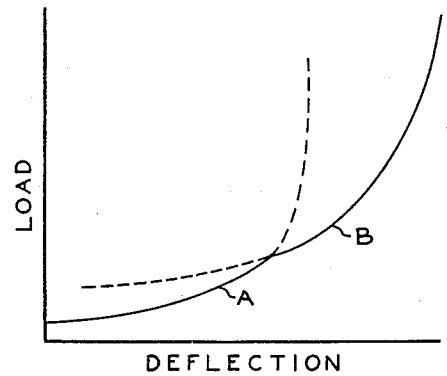

In the drawings:

FIG. 1 is an elevation view, with the principal operating parts shown in section, of a hydro-pneumatic suspension strut constructed in accordance with one embodiment of the present invention; and FIG. 2 is a plot of deflection versus load illustrating the distinct spring rates provided by the strut shown in FIG. 1.

In FIG. 1 a hydro-pneumatic suspension strut constructed in accordance with one embodiment of the present invention is indicated generally by reference numeral 11. The strut 11 includes an outer casing 12 which forms a cylinder for a hollow piston 13 mounted for telescoping movement within the casing. The piston includes a piston head 14 attached to the piston as by cap screws 16. Upper and lower wear rings 17 and 18, formed from suitable wear resistant material, afford replaceable wear surfaces and prevent heavy metal-to-metal contact. Suitable seals 19 and 21 are incorporated in the lower end of the casing. A rod 22 is attached to the lower end of the hollow piston and a mounting lug 23 permits attachment of the rod and piston to a vehicle wheel structure. An upper, outer end cap 24 is attached to the casing 12 by cap screws 26.

An inner cylinder 27 extends downwardly from the end cap 24 and in coaxial, spaced relation to the hollow piston 13 and outer casing 12. A flange 28 is welded to the lower end of the cylinder 12, and a lower end plate 29 is held in a fixed position at the lower end of the cylinder by a snapring 31. The end plate 29 has an orifice 32 formed in the central part of the end plate and one or more smaller orifices 33 formed in a peripheral portion of the end plate.

A free, or floating, piston 34, shown in a position assumed during application of a heavy load to the strut 11, is mounted for axial movement within the cylinder 27. The piston 34 has upper and lower side flanges 36 and 37 which are engageable with the inner wall of the piston 27, and a suitable seal 38 is included in the lower flange. Orifices 39 are formed in the side wall of the piston for distributing lubricating oil, added to the top of the piston 34 during initial assembly of the strut 11, to the engaged surfaces of the piston and the cylinder 27. The lower surface of the piston 34 is recessed about its periphery as indicated by the reference numeral 41 so that fluid pressure entering through the orifices 33 can act on the lower surface of the piston not exposed to fluid pressure through the orifice 32 when the piston 34 abuts the end plate 29.

An upper, central end cap 42 is suitably attached to the outer end cap 24, as by cap screws which are not illustrated, and closes the upper end of the cylinder 27. A mounting lug 43 may be integrally formed with the end cap 32 for attaching the end cap and outer casing 12 to the vehicle frame.

The interior of the hollow piston 13 and outer casing 12 is filled with hydraulic fluid to the level indicated by reference numeral 44. A gas pressure chamber 46 is provided in the upper end of casing 12 above the hollow piston 13. This gas chamber provides the air spring for the wheel suspension when the vehicle is unloaded or is only lightly loaded. The gas chamber 46 is precharged to a selected pressure through a passageway 47 formed in the cap 24 and a charging valve 48.

A second gas chamber 49 is provided in the upper part of the inner cylinder 27. As will be described hereinbelow, this chamber provides an air spring which comes into effect only after the vehicle wheel load exceeds a predetermined amount. The pressure in the chamber 49 is precharged to a pressure substantially higher than the precharge in chamber 46 through a conduit 50 and charging valve 51 in the cap 42.

The space between the inner surface of the hollow piston 13 and the outside of the inner cylinder 27 provides a passageway 52 for the transfer of pressure through the hydraulic fluid from the chamber 46 to the underside of the piston 34.

A hydraulic fluid filled expansible chamber 53 is provided beneath the piston head 14 between facing surfaces of the casing 12 and piston 13. A check valve 54 permits free flow of hydraulic fluid from the passageway 52 to the expansible chamber 53 on upward movement of the piston 13 within the casing 12. An orifice 55 restricts flow of fluid from the chamber 53 on extension of the piston 13 to damp return movement of the piston and prevent rebounding.

The strut 11 incorporates a safety shroud 56 which is so attached to the strut as to require venting of both gas chambers prior to any disassembly of the strut. Thus, when the shroud 56 is in position, it blocks access to cap screws 26. In addition to cap screws 57 the charging valve 48 serves to attach the shroud 56 to the cap 24. Charging vavle 54 must thus be removed, and chamber 46 thereby vented, prior to any removal of the cap 24. Charging valve 51 is so located as to require removal and venting of chamber 49 before either central cap 42 or the outer cap 24 can be removed.

In operation, and with no load on the strut, the precharge pressure in chamber 49 moves the floating piston 34 into engagement with the lower end plate 29. On any upward movement of the hollow piston 13 as a result of either a dynamic or static wheel load, the hollow piston 13 and hydraulic fluid carried therein causes an initial compression of the gas in chamber 46 without any compression of the gas in chamber 49. Such compression of the gas in chamber 46 continues so long as the pressure generated in chamber 46 does not exceed the precharge pressure in chamber 49. This mode of operation corresponds to the solid line portion of the load deflection curve indicated by the reference character A in FIG. 2. Such upward movement of the hollow piston 13 forces hydraulic fluid past the ball check valve 54 and into the expansible chamber 53. As shown by FIG. 2, the load deflection curve for the single air spring represented by chamber 46 becomes quite steep for large loads. In accordance with the present invention a second air spring, represented by the gas chamber 49, is automatically brought into operation for wheel loads above a certain predetermined amount, which amount is dependent upon the relationship between the precharge pressures in chambers 46 and 49. Thus, as the wheel loading exceeds the predetermined amount, and as hollow piston 13 continues to move upwardly in the strut, the pressure in chamber 46 exceeds the precharge pressure in chamber 49. The pressure transmitted to the lower face of the piston 34 then causes piston to move upwardly within the cylinder 27 and compress the gas in chamber 49. The effect of this is to add the volume of chamber 49 to the volume of chamber 46 and produce a lower spring rate and less steep load deflection curve, as represented by the solid line portion of curve B in FIG. 2. The strut thus becomes less stiff and has a higher shock absorbing capacity than would be the case if the single air spring 49 were used. By using two air springs in the manner described, the strut provides acceptable operating characteristics for both an unloaded or lightly loaded vehicle and a heavily loaded vehicle.

The rate of downward movement of both the free piston 34 and the hollow piston 13 is restricted by the hydraulic damping afforded by respective orifices 32 and 55. This effectively controls the rate of rebound of the piston 13 to prevent excessive bounce of the vehicle when operating in rough terrain and also prevents excessively high impact between piston 34 and end plate 29 and bottoming of piston head 14 against the lower end of casing 12.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:
1. A dual rate pneumatic spring suspension system for a vehicle comprising, a first cylinder and a first piston reciprocable therein, a second cylinder coaxially disposed within the first cylinder and a second piston reciprocable within the second cylinder, means defining first and second gas chambers within the respective first and second cylinders to provide pneumatic springs, said springs resisting axial movement of each piston inwardly of each cylinder, pressure transmitting means including a passageway from the first gas chamber to an open end of the second cylinder and liquid in the passageway directly exposed to the gas in the first gas chamber for transmitting all pressure from the first chamber to the piston in the second chamber, and a stop for limiting axial movement of the second piston outwardly of the second cylinder at pressures in the first chamber below the precharge pressure in the second chamber, wherein movement of the first piston inwardly of the first cylinder compresses the gas in the first chamber without compression of the gas in the second chamber until the pressure in the first chamber equals the precharged pressure in the second chamber and continued inward movement of the first piston compresses the gas in both the first and second chambers at a lowered spring rate in comparison to that which would be produced by the first chamber alone, said means defining first and second gas chambers in the respective first and second cylinders including a cap defining the upper boundaries of the gas chamber, a shroud, cap screw fastening means extending through the cap and disposed beneath the shroud, and a charging valve for the first gas chamber so located in the cap with respect to the cap screw fastening means and the shroud as to require removal of the valve and venting of the pressure in said chamber prior to removal of the cap.

2. In a hydro-pneumatic vehicle wheel suspension system, a telescoping strut comprising an outer cylinder attachable to the vehicle frame and a hollow outer piston attachable to a vehicle wheel and mounted for telescoping movement within the outer cylinder, a first chamber in the outer cylinder above the outer piston and containing gas precharged to a certain pressure, an inner cylinder disposed coaxially within the outer cylinder and outer piston, a floating inner piston axially movable within the inner cylinder, a second chamber within the inner cylinder above the floating piston and containing gas precharged to a higher pressure than the gas in the first chamber, a lower end plate in the inner cylinder limiting movement of the floating piston outwardly of the inner cylinder, a passageway extending between the outer piston and the coaxial inner cylinder from the first chamber to the lower face of the floating piston, said passageway being filled with hydraulic fluid which is exposed to the gas in the first chamber and which is in contact with the lower face of the floating piston for transmitting pressure therebetween to move the floating piston upwardly and to compress the gas in the second chamber only when the pressure in the first chamber exceeds the precharge pressure in the second chamber, an orifice in the end plate for damping movement of the floating piston, a third chamber of variable volume and filled with liquid disposed between the outer piston and the outer cylinder and in communication with the fluid in said passageway, a check valve permitting free flow of fluid from the passageway to the third chamber during retraction of the outer piston within the outer cylinder, and an orifice for restricting flow of fluid from the third chamber to damp movement of the outer piston outward from the outer cylinder.

3. A hydro-pneumatic wheel suspension comprising a telescoping strut having an outer cylinder and a hollow outer piston mounted for telescoping movement within the outer cylinder, a first chamber within the outer cylinder and outer piston and containing gas precharged to a certain pressure, an inner cylinder disposed coaxially within the outer cylinder and outer piston, a floating inner piston axially movable within the inner cylinder, a second chamber within the inner cylinder above the floating piston and containing gas precharged to a higher pressure than the gas in the first chamber, a lower end plate in the inner cylinder limiting movement of the floating piston outwardly of the inner cylinder, a passageway extending between the outer piston and the coaxial inner cylinder from the first chamber to the lower face of the floating piston, said passageway containing hydraulic fluid which is exposed to the gas in the first chamber and which is in contact with the lower face of the floating piston for transmitting pressure therebetween to move the floating piston upwardly and to compress the gas in the second chamber only when the pressure in the first chamber exceeds the precharge pressure in the second chamber, an orifice in the end plate for damping movement of the floating piston, a third chamber of variable volume and filled with liquid disposed between the outer piston and the outer cylinder and in communication with the fluid in said passageway, a check valve permitting free flow of fluid from the passageway to the third chamber during retraction of the outer piston within the outer cylinder, and an orifice for restricting flow of fluid from the third chamber to damp movement of the outer piston outward from the outer cylinder.

4. A hydro-pneumatic vehicle wheel suspension strut comprising, a first tubular member closed at an upper end, a second tubular member closed at a lower end and telescopingly and sealably associated with the first member to provide a first compression chamber therewithin containing gas precharged to a certain pressure, a third tubular member closed at an upper end and coaxial with and spaced inwardly from the first and second members to provide a passageway between the third member and the first and second members, an inner piston reciprocable in the third member to provide a second compression chamber in the closed upper end of the third member containing gas precharged to a higher pressure than the gas in the first compression chamber, stop means for limiting movement of the inner piston away from the closed end of the third member, and a body of liquid carried within the first and second members and having an upper surface directly exposed to the gas in the first compression chamber to define the lower boundary of the first compression chamber, said body of liquid extending within the passageway and into engagement with a lower surface of the inner piston to transmit pressure from the first compression chamber to the piston and to move the inner piston to compress the gas in the second compression chamber when the pressure in the first chamber exceeds the precharge pressure in the second chamber.

References Cited in the file of this patent
UNITED STATES PATENTS

| | | |
|---|---|---|
| 2,197,474 | Johnson | Apr. 16, 1940 |
| 2,222,845 | Johnson | Nov. 26, 1940 |
| 2,404,111 | Underwood | July 16, 1946 |
| 2,405,733 | Boldt | Aug. 13, 1946 |
| 2,769,632 | Bourcier de Carbon | Nov. 6, 1956 |
| 3,083,000 | Perdue | Mar. 26, 1963 |

UNITED STATES PATENT OFFICE
CERTIFICATE OF CORRECTION

Patent No. 3,168,302              February 2, 1965

Richard A. Burris

It is hereby certified that error appears in the above numbered patent requiring correction and that the said Letters Patent should read as corrected below.

Column 3, line 9, for "vavle" read -- valve --; column 4, lines 4 to 6, strike out "cylinder, pressure transmitting means including a passageway from the first gas chamber to an open end of the second cylinder and liquid in the passageway di-" and insert instead -- cylinder, pressure transmitting means including fluid di- --.

Signed and sealed this 29th day of June 1965.

(SEAL)
Attest:

ERNEST W. SWIDER
Attesting Officer

EDWARD J. BRENNER
Commissioner of Patents